United States Patent
Hara

(10) Patent No.: US 7,324,300 B2
(45) Date of Patent: Jan. 29, 2008

(54) HEAD POSITION CONTROL METHOD, HEAD POSITION CONTROL DEVICE AND DISK DEVICE

(75) Inventor: Takeshi Hara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/526,781

(22) Filed: Sep. 25, 2006

(65) Prior Publication Data

US 2007/0253094 A1 Nov. 1, 2007

(30) Foreign Application Priority Data

Apr. 27, 2006 (JP) .............................. 2006-123605

(51) Int. Cl.
G11B 5/596 (2006.01)
(52) U.S. Cl. ................................... 360/78.04
(58) Field of Classification Search ............. 360/78.04, 360/77.02, 77.05, 77.07, 77.08, 77.11, 78.09, 360/75, 69, 78.14, 49, 29, 31
See application file for complete search history.

(56) References Cited

U.S. PATENT DOCUMENTS

| | | | | | |
|---|---|---|---|---|---|
| 5,270,878 A | * | 12/1993 | Kaida et al. | ................ | 360/49 |
| 5,600,506 A | * | 2/1997 | Baum et al. | ................ | 360/78.14 |
| 5,812,338 A | * | 9/1998 | Ogasawara et al. | ................ | 360/77.08 |
| 6,018,435 A | * | 1/2000 | Uno et al. | ................ | 360/78.14 |
| 6,078,461 A | * | 6/2000 | Smith et al. | ................ | 360/77.08 |
| 6,204,984 B1 | * | 3/2001 | Uno et al. | ................ | 360/69 |
| 6,611,390 B1 | * | 8/2003 | Egan | ................ | 360/31 |
| 6,819,512 B2 | * | 11/2004 | Kirby | ................ | 360/29 |
| 6,922,297 B2 | * | 7/2005 | Kirby | ................ | 360/29 |
| 6,950,256 B2 | | 9/2005 | Kadokawa | ................ | 360/48 |
| 2005/0046993 A1 | | 3/2005 | Hanazawa et al. | | |
| 2006/0082918 A1 | * | 4/2006 | Kosugi et al. | ................ | 360/75 |

FOREIGN PATENT DOCUMENTS

| | | |
|---|---|---|
| JP | 60-117461 | 6/1985 |
| JP | 3-263662 | 11/1991 |
| JP | 2002-237142 | 8/2002 |
| JP | 2003-016745 | 1/2003 |
| JP | 2004-334931 | 11/2004 |

* cited by examiner

Primary Examiner—Fred F. Tzeng
(74) Attorney, Agent, or Firm—Greer, Burns & Crain, Ltd.

(57) ABSTRACT

A head position control device controls the position of a head with respect to a disk where post code is assigned to a servo frame. Servo frames of a disk is constituted by a servo frame not having a post code recorded in an inner side zone and a servo frame having a post code recorded in an outer side zone. The device reads the servo frame, demodulates a current position from the servo frame, drives an actuator according to the modulated position, and controls the position of the head to a target position. While implementing a high TPI, the inspection time for post codes can be decreased with a servo frame occupying ratio in consideration of the data format.

20 Claims, 16 Drawing Sheets

HEAD POSITION CONTROL METHOD, HEAD POSITION CONTROL DEVICE AND DISK DEVICE

CROSS-REFERENCE TO RELATED APPLICATIONS

This application is based upon and claims the benefit of priority from the prior Japanese Patent Application No. 2006-123605, filed on Apr. 27, 2006, the entire contents of which are incorporated herein by reference.

BACKGROUND OF THE INVENTION

1. Field of the Invention

The present invention relates to a head position control method, head position control device and disk device, for controlling the position of the head by compensating periodic disturbance, such as eccentricity, and more particularly to a head position control method, head position control device and disk device for implementing high track pitch and optimizing the inspection process.

2. Description of the Related Art

In a disk device which reads/writes data on a rotating recording disk, such as a magnetic disk device or optical disk device, accurately positioning a head to a target track, that is so called "following", is extremely important to improve recording density.

For a recording disk, which rotates, on the other hand, positioning accuracy is decreased by such periodic disturbance as eccentricity and other non-periodic disturbance, so in order to implement high density track pitch, improvement of the position accuracy is required.

FIG. 16 is related diagram of the head position of the disk and position accuracy. As shown in the relational diagram of POS (Position) accuracy (TRO: Total Run Out) and the radius direction of the disk in FIG. 16, the POS accuracy is generally high, that is TRO is high, in the outer side on the disk because of the movement of the medium, and in the inner side, POS accuracy is low, that is TRO is low. Therefore it has been proposed to make the track pitch of the inner side different from that of the outer side on the disk plane (e.g. Japanese Patent Application Laid-Open No. 2002-237142 and 2003-016745).

However, if TPI is decreased, that is the track pitch is increased in the outer side, as the dotted line C in the relational diagram of the critical TPI (Track Per Inch) and the position in the radius direction of the disk in FIG. 16 shows, the track width increases. Therefore, the position of the head shifts due to vibration, and old data may not be converted into new data during write. In other words, two data may exist in the same LBA (Logical Block Address). Therefore the TPI lower limit at which data is changed is set, as the bold line A2 shows.

If the TPI is increased, that is the track pitch is decreased, in the inner side, as shown by the dotted line C in FIG. 16, on the other hand, the track space decreases and data on the adjacent track may be affected (e.g. data on the adjacent track is erased) when data is written on a track. Therefore the TPI upper limit is set based on ATI (Adjacent Track Influence) resistance, as the bold line A1 shows.

Also as the solid line B shows in FIG. 16, there is a TPI that must be satisfied as the average of all zones (called the average required TPI), so it is difficult to determine TPI according to the POS accuracy, as the dotted line in FIG. 16 shows.

TRO in the relational diagrams in FIG. 16 is the sum of RRO (Repeatable Run Out), which is a periodic disturbance, and NRRO (Non-Repeatable Run Out) which is a non-periodic disturbance. A post code technology to improve this RRO has been proposed (e.g. Japanese Patent Application Laid-Open No. H03-263662 and No. S60-117461).

As FIG. 18 shows, a sector of the magnetic disk 100 is comprised of a servo frame 101 and a data area 102. The servo frame 101 is further comprised of a preamble 110, servo mark 112, frame code 114, gray code 116 and burst signal 118. The frame code 114 and gray code 116 constitute a track number, and the burst signal 118 is a four phase burst (A/B/C/D) or a two phase burst (Even/Odd) signal, so as to recognize a position within a track by the head output.

By decreasing the burst area 118 of the servo frame 101, a post code 120 is assigned. After the magnetic disk 100 is mounted on the device, the magnetic disk 100 is rotated, and the eccentricity (RRO) in each sector is measured, and the eccentricity correction amount is written in the post code 102. When the disk device is operating, the servo frame 101 is read, the burst signal 118 and post code 120 are demodulated, the current position acquired from the burst signal 118 is corrected using the eccentricity correction amount of the post code 120, the current position including eccentricity is calculated, and head position is controlled so as to cancel the eccentricity.

By using this post code, the POS accuracy (TRO) in FIG. 16 is improved for the amount of RRO, and as the dotted line C1 of the relational diagram of the critical TPI and disk position in FIG. 17 show, the critical TPI can be improved from the original characteristic C, and high TPI can be implemented.

SUMMARY OF THE INVENTION

However the post code technology, as a method for improving POS accuracy, must measure the eccentricity of each sector of the disk of each device, and write the correction amount into the post code area of each sector in the inspection step at the device manufacturer. Therefore enormous inspection time is required. For example, if there are 10,000 tracks on a disk face and 20 sectors are created in each track, 200,000 post codes must be measured and written. This inspection time can no longer be ignored since TPI is increasing, and a further cost reduction in mass production is currently demanded.

With the foregoing in view, it is an object of the present invention to provide a head position control method, head position control device and disk device for decreasing the inspection time for post codes while implementing high TPI.

It is another object of the present invention to provide a head position control method, head position control device and disk device for implementing cost reduction even if track density is increased.

It is still another object of the present invention to provide a head position control method, head position control device and disk device for decreasing inspection time for post code at the servo frame occupying ratio considering the data format while implementing high TPI.

A disk device of the present invention has a disk divided into at least an inner side zone and an outer side zone, where a servo frame not having a post code is recorded in the inner side zone and a servo frame having a post code is recorded in the outer side zone, a head for at least reading the servo frame and data on the disk, an actuator for moving the head in the radius direction of the disk, and a control unit for demodulating a current position from the servo frame read by the head, driving the actuator according to the demodulated position, and controlling the position of the head to a target position.

A head position control method of the present invention has a step of reading a servo frame and data on a disk divided into at least an inner side zone and an outer side zone where a servo frame not having a post code is recorded in the inner side zone and a servo frame having a post code is recorded in the outer side zone, by a head, a step of demodulating a current position from the servo frame read by the head, and a step of driving an actuator for moving the head in the radius direction of the disk and controlling the position of the head to a target position.

A head position control device of the present invention has a circuit for demodulating a current position from a servo frame read from a disk divided into at least an inner side zone and an outer side zone, where a servo frame not having a post code is recorded in the inner side zone and a servo frame having a post code is recorded in the outer side zone, by a head, and a control circuit for driving an actuator for moving the head in the radius direction of the disk according to said modulated position, and controlling the position of the head to the target position.

In the present invention, it is preferable that the control unit corrects the demodulated position of a burst signal of the servo frame using a correction value of the post code, and demodulates the current position of the head.

Also in the present invention, it is preferable that the control unit changes the length of the servo gate signal for extracting the servo frame from the read output of the head according to the target position.

Also in the present invention, it is preferable that the control unit judges that the target position is in the outer side zone, and makes the length of the servo gate signal for extracting the servo frame longer than the length of the servo gate signal on the inner side.

Also in the present invention, it is preferable that the length of the servo frame not having the post code of the disk, and the length of the servo frame having the post code are the same.

Also in the present invention, it is preferable that the burst signal length of the servo frame not having the post code is increased to be the same as the length of the servo frame having the post code.

Also in the present invention, it is preferable that a track slip area is provided between the inner side zone and the outer side zone of the disk.

Also in the present invention, it is preferable that the control unit measures the position accuracy of each zone of the disk and determines the boundary between the inner side zone and outer side zone.

Also in the present invention, it is preferable that the control unit has a table for storing the respective servo gate length of the outer side zone and inner side zone.

Also in the present invention, it is preferable that the disk is a magnetic disk and the head is a magnetic head.

In this invention, the servo frames of a disk has a servo frame not having a post code in the inner side zone, and a servo frame having a post code in the outer side zone, and the current position is demodulated from the servo frame, the actuator is driven according to the demodulated position, and the position of the head is controlled to a target position. So the inspection time for the post codes can be decreased with the servo frame occupying ratio considering the data format, while implementing high TPI.

DESCRIPTION OF THE PREFERRED EMBODIMENTS

Embodiments of the present invention will now be described in the sequence of disk device, first embodiment, servo frame write method, second embodiment and other embodiments, but the present invention is not limited to these embodiments.

Disk Device

Figure 1:
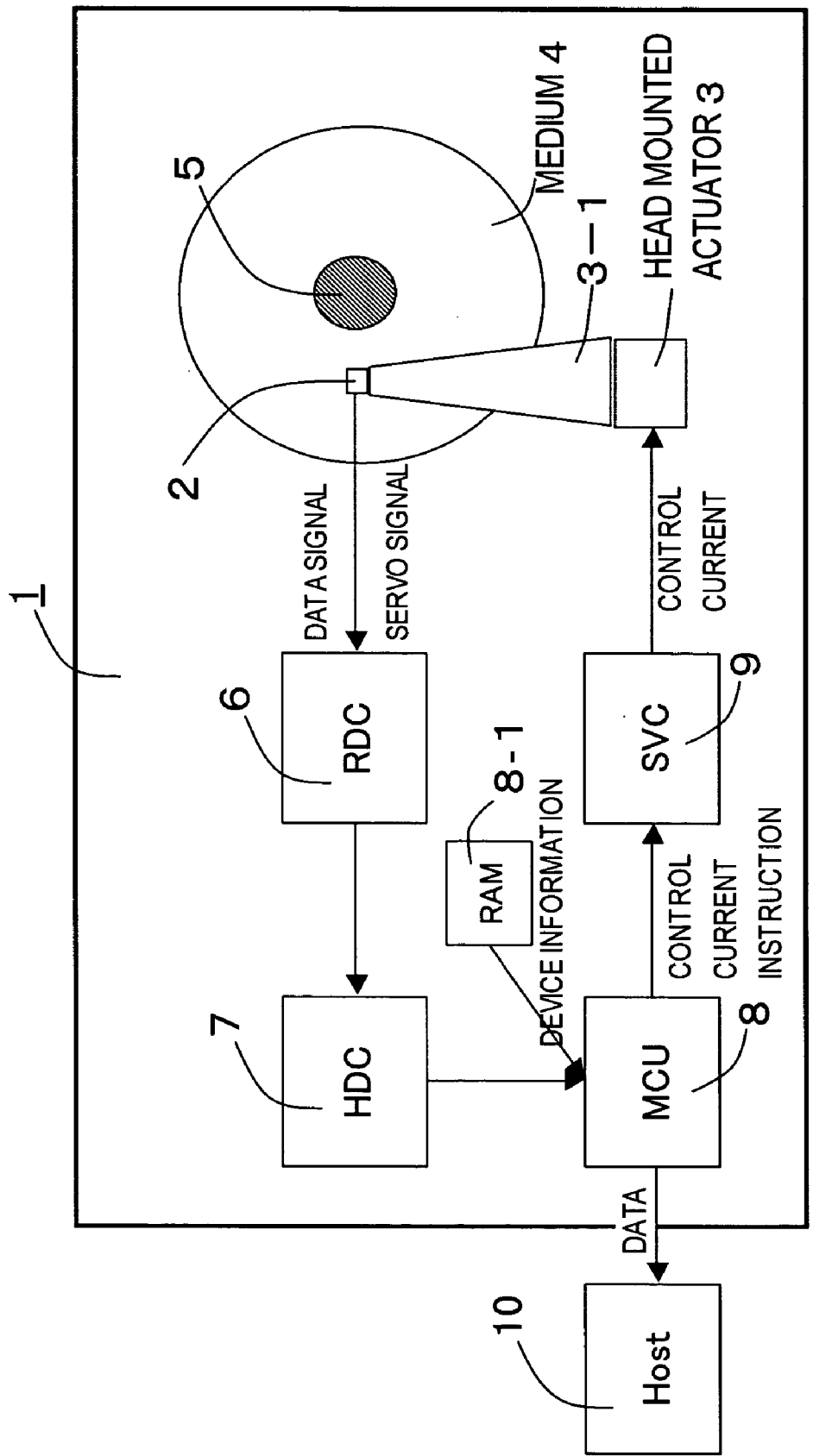
FIG. 1 is a block diagram depicting a disk device according to an embodiment of the present invention.
Figure 2:
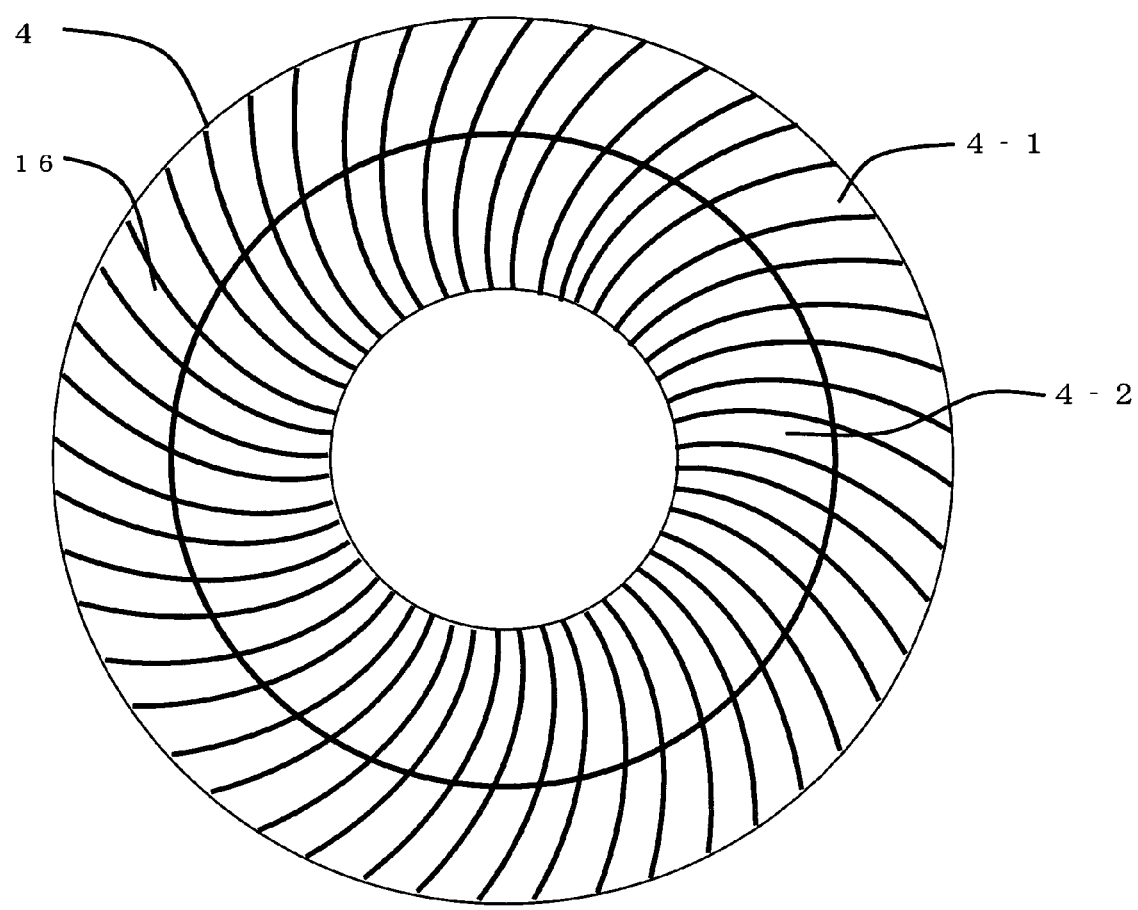
FIG. 2 is a diagram depicting the position signals of the disk in FIG. 1.

FIG. 1 is a block diagram depicting a disk device according to an embodiment of the present invention, and FIG. 2 is a diagram depicting the arrangement of the servo frames on the magnetic disk in FIG. 1.

FIG. 1 shows a magnetic disk device 1 as a disk device. As FIG. 1 shows, a magnetic disk 4, which is a magnetic storage medium, is installed at a rotation axis 5 of a spindle motor (not illustrated). The spindle motor rotates the magnetic disk 4. An actuator (VCM) 3 has a magnetic head 2 at the tip of the arm and the suspension 3-1, and moves the magnetic head 2 in the radius direction of the magnetic disk 4.

The actuator 3 is comprised of a voice coil motor (VCM) which rotates with the rotation axis as the center. In FIG. 1, one or two magnetic disks 4 are mounted on the magnetic disk device, and two or four magnetic heads 2, installed corresponding to each magnetic disk face, are simultaneously driven by the same actuator 3.

The magnetic head 2 has a read element and write element. The magnetic head 2 is comprised of a read element, including a magneto-resistance (MR) element, stacked on the slide, and a write element, including the write coil, stacked thereon.

A read/write channel 6 demodulates a position signal (analog signal) read by the magnetic head 2, and demodulates the data signal, and also controls the reading and writing of the magnetic head 2. The servo controller 9 drives the spindle motor, and computes the VCM drive instruction value by servo control, according to an error between the current position from the read/write channel 6 and the target position, supplies the drive current to the voice coil motor (VCM) 3, and drives the VCM 3.

A microcontroller (MCU) 8 performs the communication of the commands and data with the host 10, analyzes the commands, and controls the entire device. A memory 8-1, which is comprised of a read only memory (ROM) and random access memory (RAM), stores data and parameters, such as device information, for processing of the MCU 8.

A hard disk controller (HDC) 7 judges a position in one track based on the sector number of the servo signal, and records/reproduces the data. The HDC 7 has a random access memory (RAM) for a buffer, and temporarily stores the read data or write data.

As FIG. 2 shows, on the magnetic disk 4, servo frames (position signals) 16 are arranged in each track in the circumference direction from the outer circumference to the inner circumference at an equal interval. Each track has a plurality of sectors, and the solid lines in FIG. 2 indicate a position where the servo signals 16 of each sector are recorded. Therefore the data area is between the servo frames 16.

First Embodiment

Figure 3:
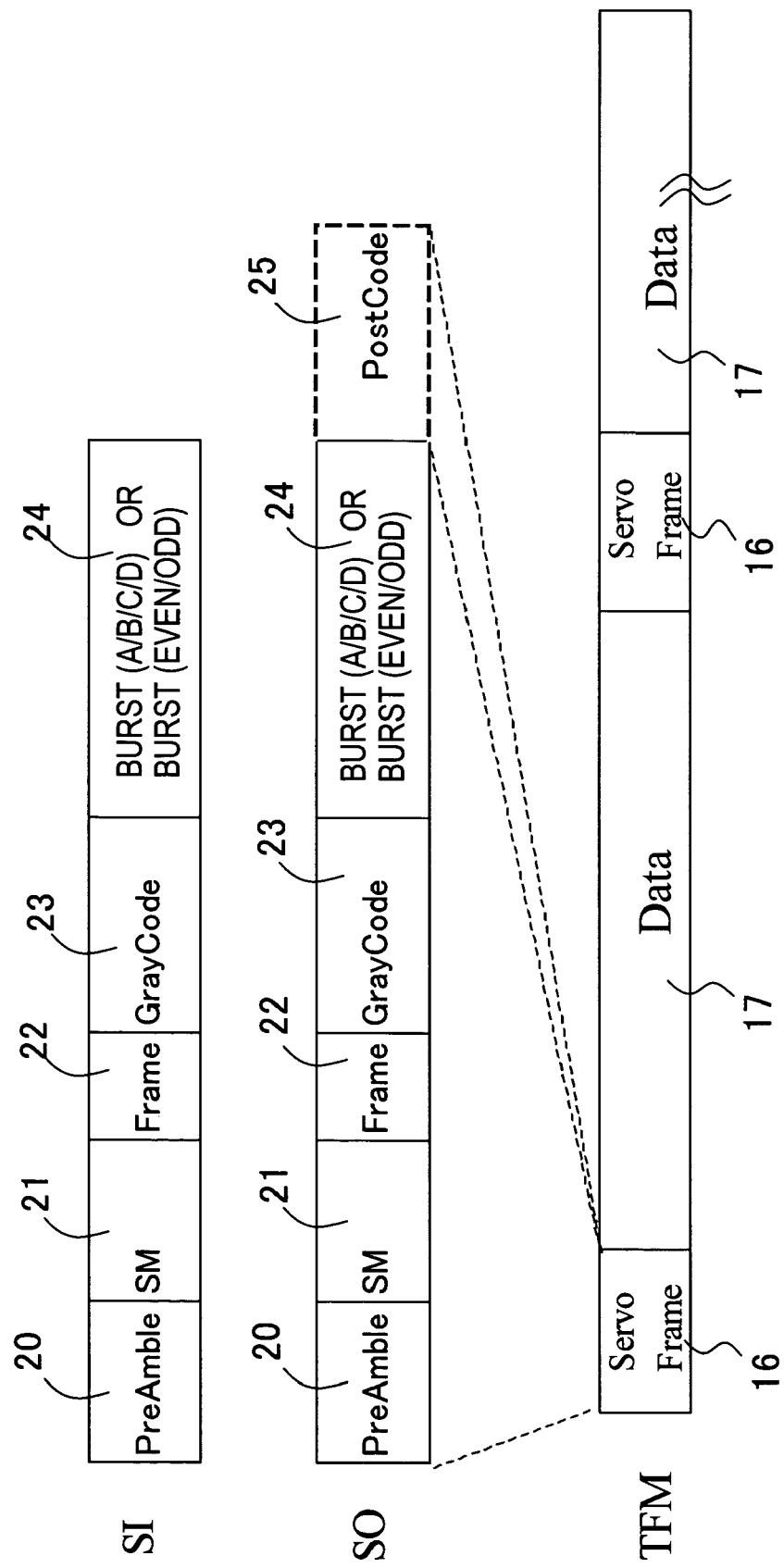
FIG. 3 is a diagram depicting the configuration of the servo frame according to the first embodiment of the present invention.
Figure 4:
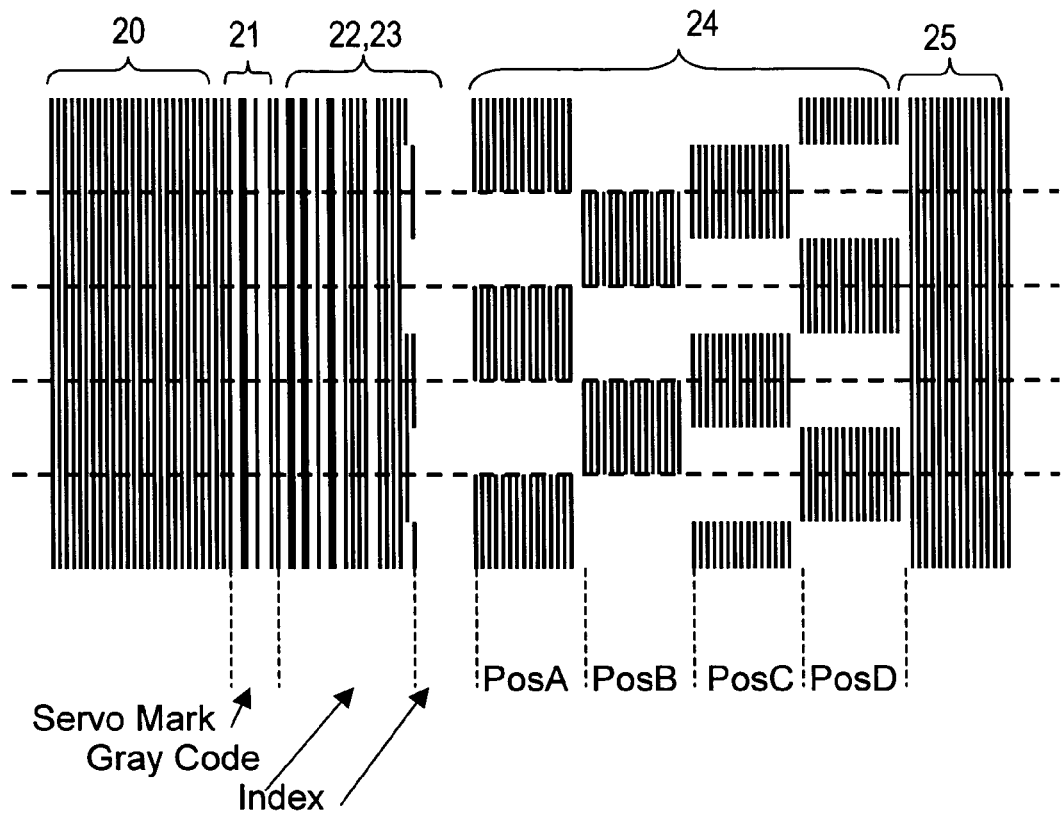
FIG. 4 is a diagram depicting the servo frame in FIG. 3.
Figure 5:
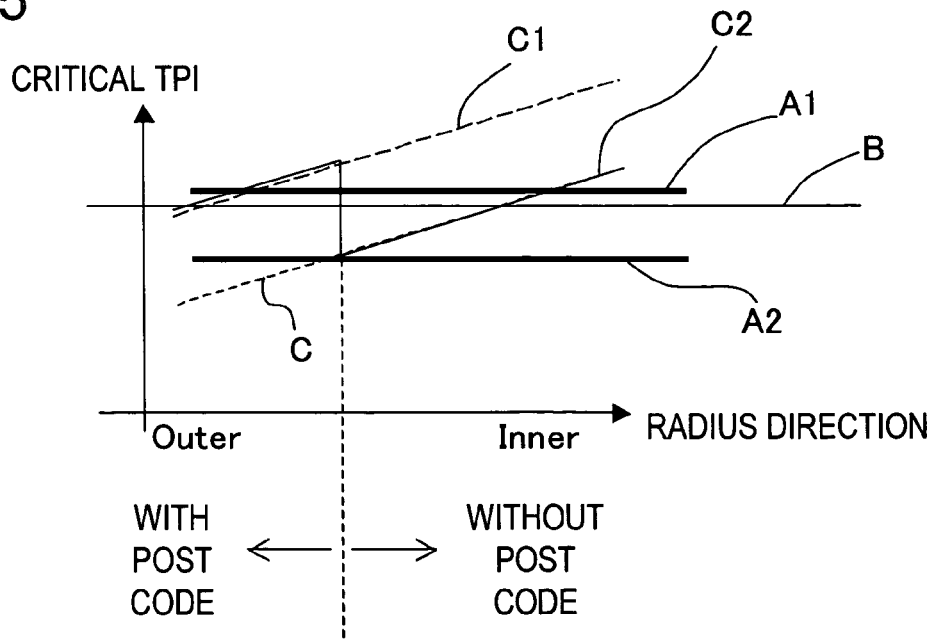
FIG. 5 is a characteristic diagram when the servo frame in FIG. 3 is used.

FIG. 3 is a diagram depicting the servo frame according to the first embodiment of the present invention, FIG. 4 is a diagram depicting the servo frame thereof, and FIG. 5 is a diagram depicting the first embodiment of the present invention.

As FIG. 3 shows, in the track format TFM, a sector is comprised of a combination of a servo frame 16 and a data area 17, and a plurality of sectors are formed for one track of the disk. In the present embodiment, a servo frame for the inner zone SI and a servo frame for the outer zone SO are set as the servo frames 16. In the inner zone 4-2 of the disk 4 in FIG. 2, the servo frame for the inner zone SI is used, and in the outer zone 4-1, the servo frame for the outer zone SO is used.

The servo frames SI and SO will now be described with reference to FIG. 4. The servo frames SI and SO comprise a preamble 20, servo mark 21, frame code 22, gray code 23 and burst signal 24. A post code 25 is set only for the servo frame for the outer zone SO.

FIG. 4 shows an example of a four-phase burst signal, and the start of servo information is recognized by the servo mark 21, the frame code 22 and gray code 23 indicate a track number, and a position in the track can be detected by PosA, PosB, PosC and PosD of the offset information (servo burst) 24. The dotted line in FIG. 4 shows the track center, and the position shift from the track center is detected by the demodulation of the servo burst signal.

The servo frame in FIG. 4 is read by the head 2, and the position of the magnetic head on the disk in the radius direction is detected using the track number and the offset information PosA, PosB, PosC and PosD. Also here, based on the index signal Index, the position of the magnetic head in the circumference direction is acquired.

For example, the sector number when the index signal is detected is set to No. 0, which is counted up each time a servo signal is detected, and the sector number of each sector of the track is acquired. The sector number of the servo signal becomes a reference when the data is recorded and reproduced. There is one index signal in a track. A sector number may be set instead of the index signal.

As FIG. 3 and FIG. 4 show, the post code 25 is set after the burst signal 24 only for the outer side. To confirm the position of the head, the servo frames 16 are recorded on the magnetic disk 4 in advance, as shown in FIG. 2 to FIG. 4.

Figure 17:
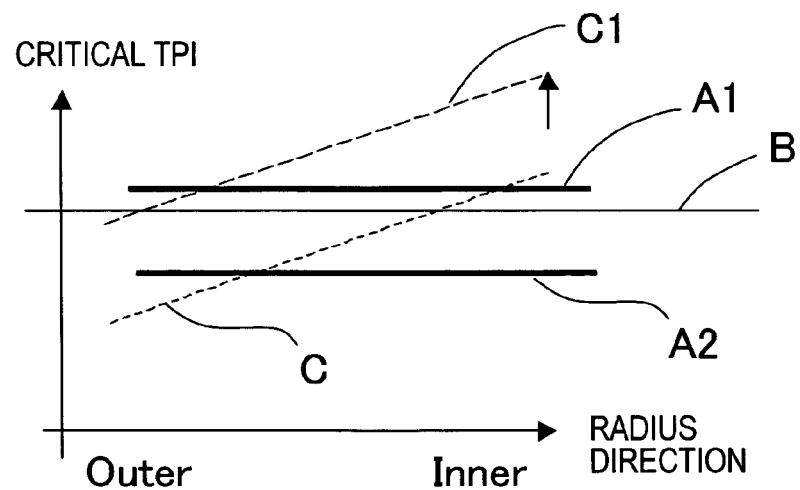
FIG. 17 is a TPI characteristic diagram when a conventional post code is used.
Figure 18:
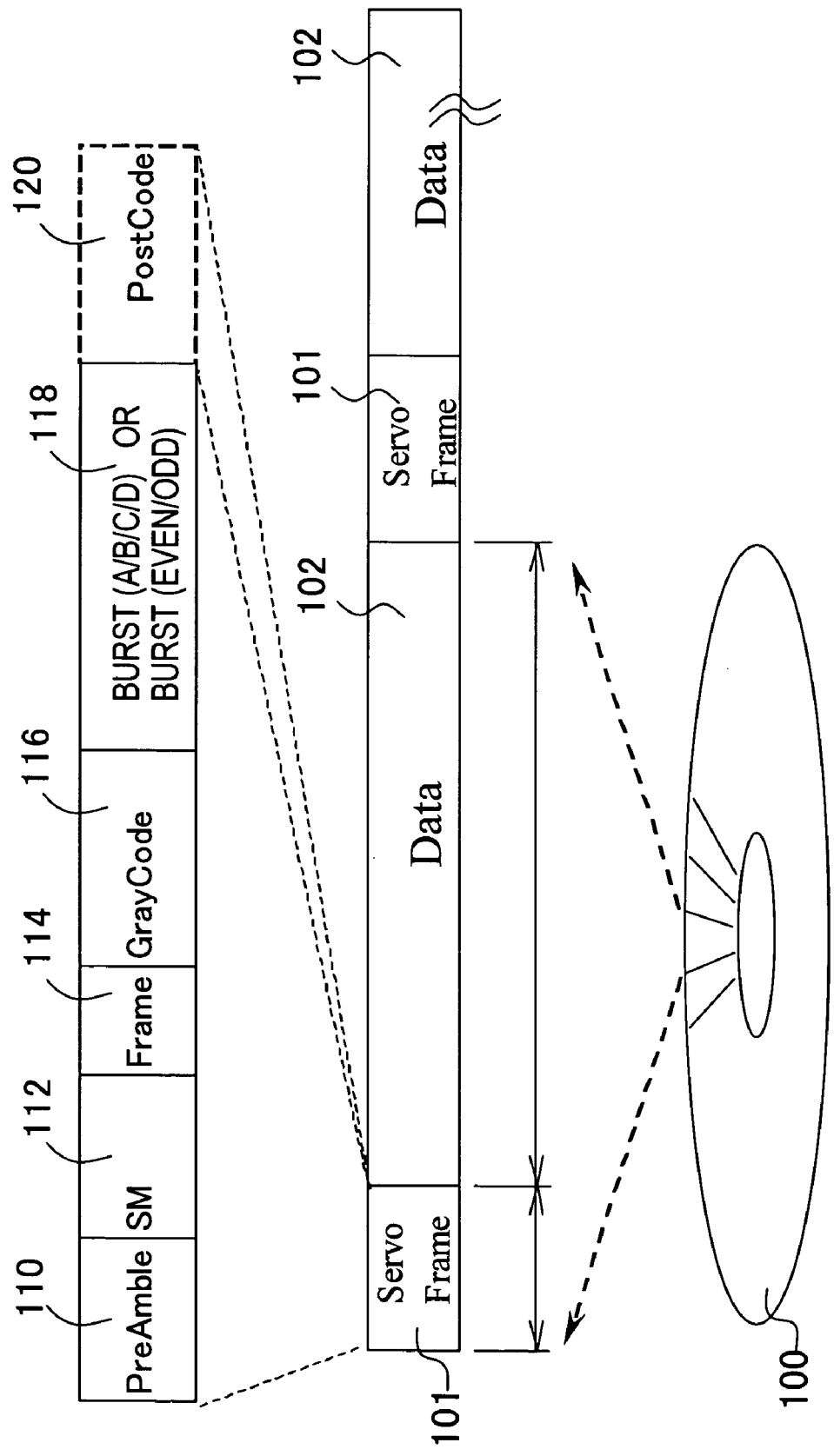
FIG. 18 is a diagram depicting a conventional post code.

As FIG. 3 shows, the post code 25 is written to the servo frames 16 only for the outer zone 4-1. As described in FIG. 17, if a post code is set for the servo frames of all areas of the disk 4, the critical TPI is improved, but is improved more than necessary (more than the upper limit of TPI) in the inner side.

Therefore in the present invention, the post code 25 is not set for the inner zone 4-2. In other words, as FIG. 5 shows, the critical TPI for the outer zone 4-1, where the post code 25 is set, is improved, but the critical TPI of the inner zone 4-2, where the post code 25 is not set, is not improved.

This means that the post code is assigned only for the outer zone for which improvement of the critical TPI is required. By this, the critical TPI characteristic of the disk 4 becomes like the solid line C2 in FIG. 5, and satisfies a line B, which is the average required TPI. Since the post code 25 is not set for the inner zone 4-2, RRO can be measured and the eccentricity correction amount can be written in the post code 25 only for the outer zone 4-1 in the inspection step at the manufacturer. Therefore the inspection time of the post code can be considerably decreased.

By this as well, the TPO characteristic indicated by the critical TPI is improved, as mentioned above, so inspection time can be decreased, and positioning accuracy can be improved with improving productivity. In other words, disk devices with excellent position accuracy can be provided at low cost.

Also as FIG. 3 shows, the data area 17 can be expanded for the amount of the post code, in the inner side zone where the post code 25 is not set. Therefore the present invention also has an effect to increase data capacity.

Figure 6:
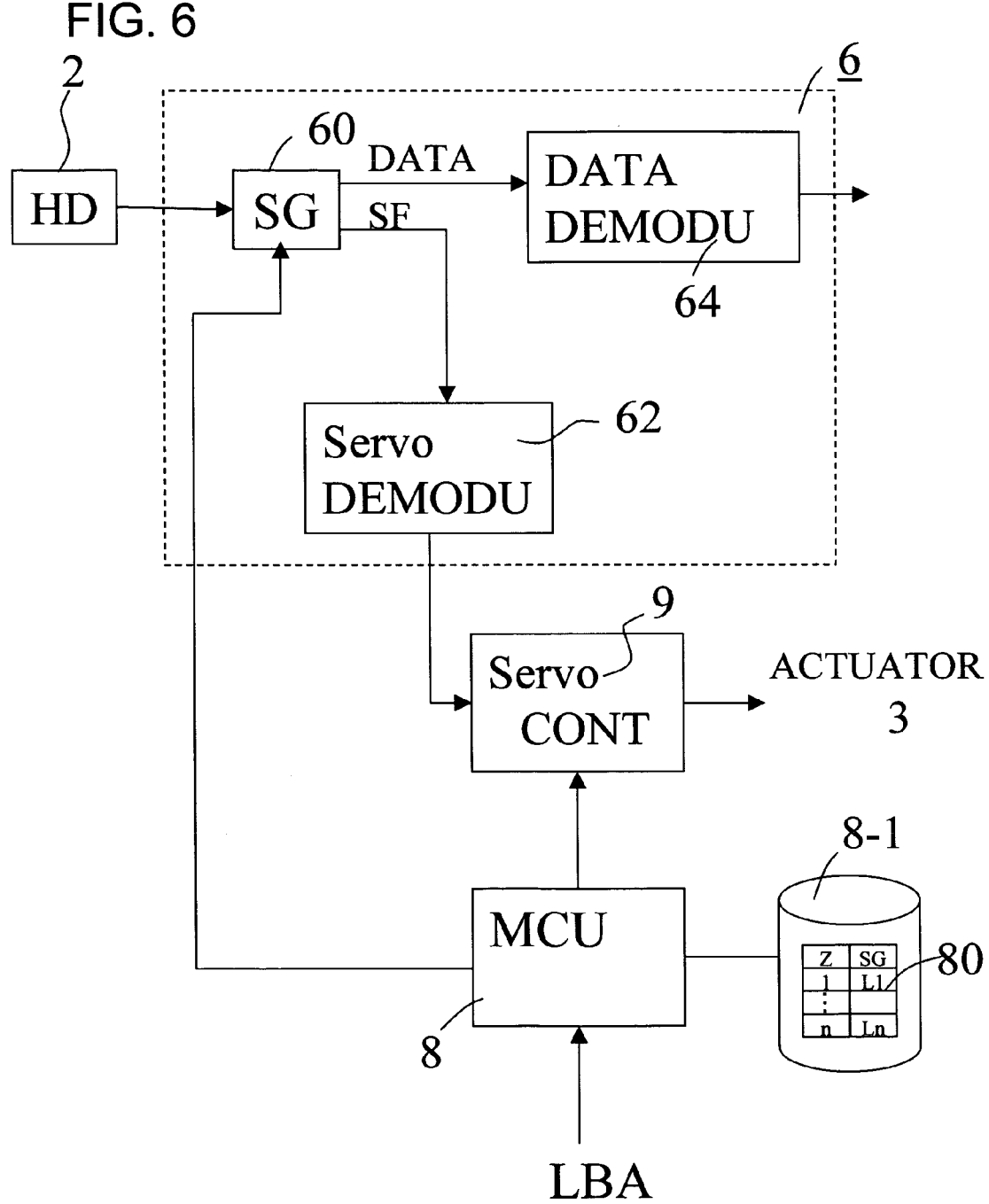
FIG. 6 is a block diagram depicting the embodiment in FIG. 3.
Figure 7:
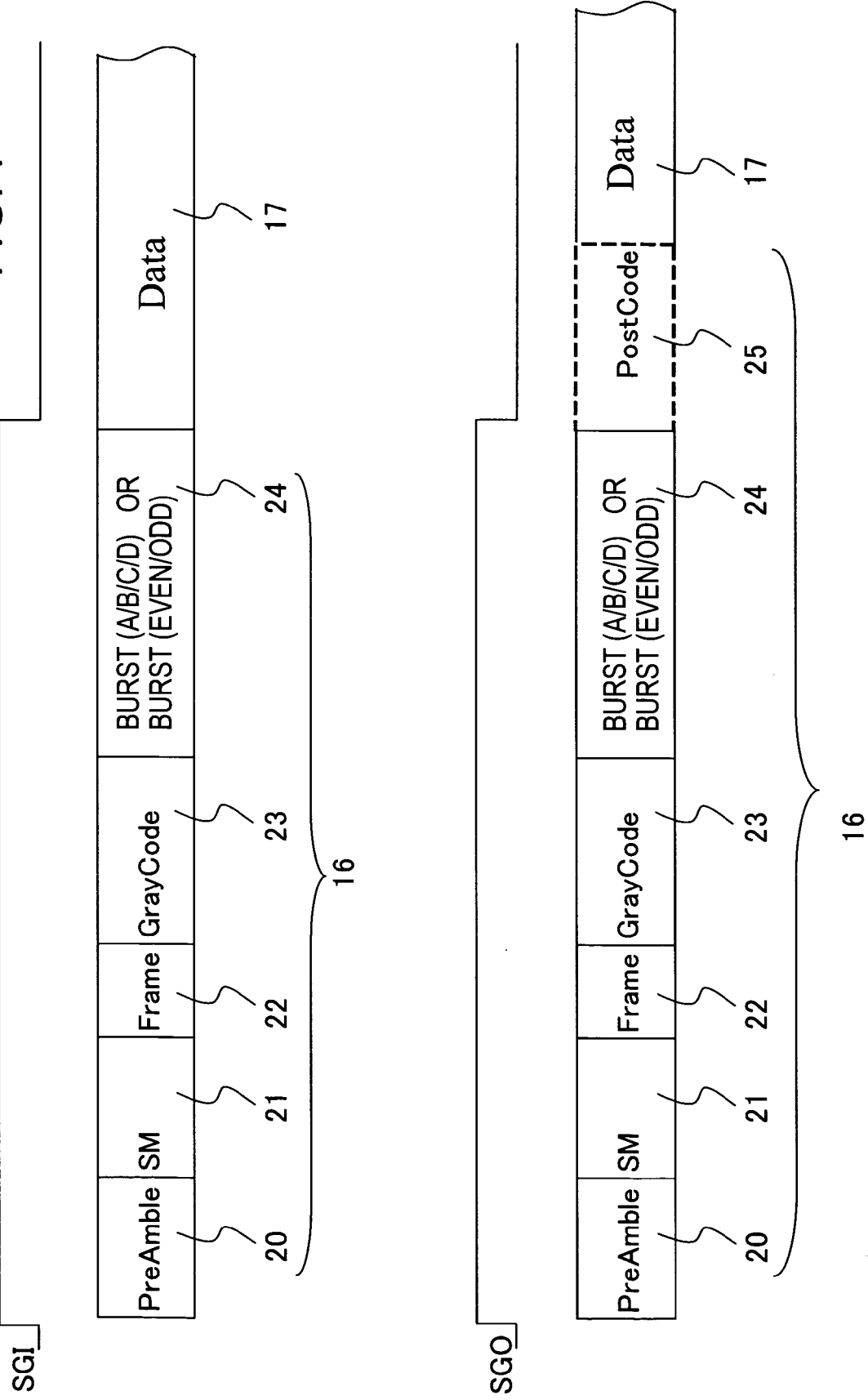
FIG. 7 is a diagram depicting the servo gate in FIG. 6.
Figure 8:
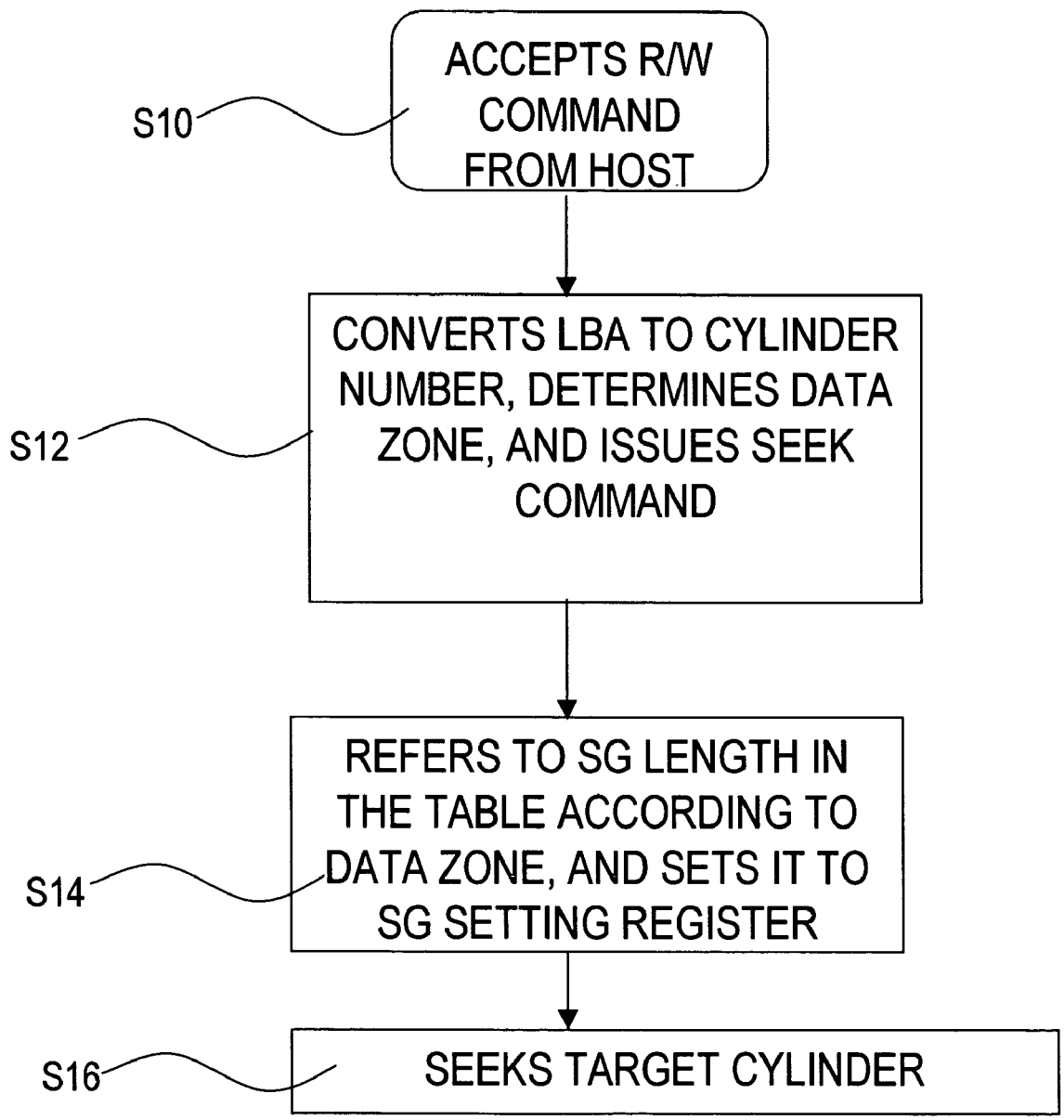
FIG. 8 is a flow chart depicting the processing of the MCU in FIG. 6.

FIG. 6 is a block diagram for implementing the embodiment in FIG. 3, using the configuration in FIG. 1, FIG. 7 is a diagram depicting the servo gates thereof, and FIG. 8 is a flow chart depicting the processing of the MCU 8 in FIG. 6.

As FIG. 6 shows, the read/write channel 6 has a servo gate circuit 60, a servo demodulation circuit 62 and a data demodulation circuit 64. The servo gate circuit 60 acquires the servo frame 16 by the servo gate signal using the read signal from the head 2, outputs it to the servo demodulation circuit 62, and outputs the signal of the data area to the data demodulation circuit 64.

The data demodulation circuit 64 performs a known PR (Partial Response)-4 method and maximum likelihood decoding, to demodulate the data. The servo demodulation circuit 62, on the other hand, demodulates the servo frame 16 separated by the above mentioned servo gate signal, recognizes that this is a servo frame by the servo mark, and demodulates the track number from the frame code and gray code, and the position in the track from the burst signal.

In order to demodulate the position in the track from the burst signal, two-phase PosN and PosQ are demodulated from the output level of the four-phase burst PosA-PosD in the case of the four-phase burst in FIG. 4, for example, and the position signal in the track is created. If a post code exists, the data demodulation circuit 64 demodulates the eccentricity correction amount of the post code, and corrects the above mentioned position signal.

This position information (that is current position) is output to the servo controller 9. The servo controller 9 receives the target position from the later mentioned MCU 8, computes the control value (drive value) of the actuator 3 by a known servo computation according to the position error between the target position and current position, and drives the actuator 3. For this servo controller 9, a known servo control system, such as an observer control system or PID control system, for example, can be used.

The MCU 8 refers to the table 80 of the memory 8-1 and performs the processing in FIG. 8. In other words, the MCU 8 receives the read/write command from the host 10 (see FIG. 1) (S10). The MCU 8 converts the LBA (Logical Block Address) included in the command into the cylinder number (target position), determines the data zone (outer or inner zone in the case of FIG. 2) from the cylinder number, and issues the seek instruction to the servo controller 9 (S12). The table 80 stores the servo gate length SG of the data zone. The MCU 8 refers to the servo gate length SG according to the data zone in the table, and sets it in the SG setting register (not illustrated) of the servo gate circuit 60 (S14). The MCU 8 instructs the servo controller 9 and the HDC 7 (FIG. 1) to start the seek of the target cylinder (S16).

As FIG. 7 shows, by setting the servo gate length in the SG setting register (not illustrated) of the servo gate circuit 60, the servo gate circuit 60 generates the servo gate SGI having the length of preamble 20, servo mark 21, frame code 22, gray code 23 and burst signal 24 and acquires the servo frame in the seek to the inner zone. In the seek to the outer zone, the servo gate SGO having the length of preamble 20, servo mark 21, frame code 22, gray code 23, burst signal 24 and post code 25 is generated, and the outer side servo frame is acquired.

When the post code is assigned only to the outer side like this, the servo frame can be accurately extracted by changing the servo gate length between the inner side and outer side.

Servo Frame Write Method

Figure 9:
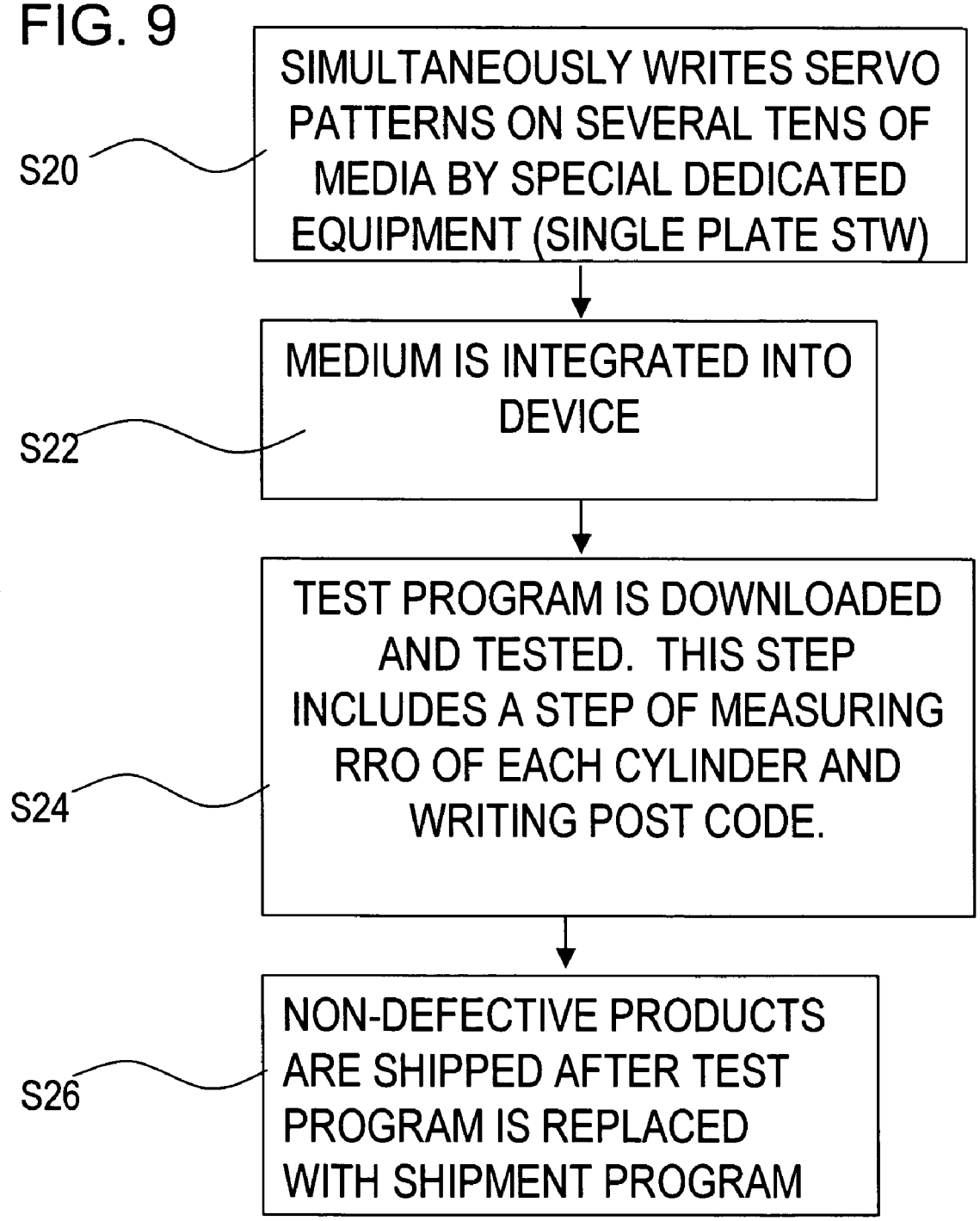
FIG. 9 is a flow chart depicting the test step for the disk device in FIG. 1.
Figure 10:
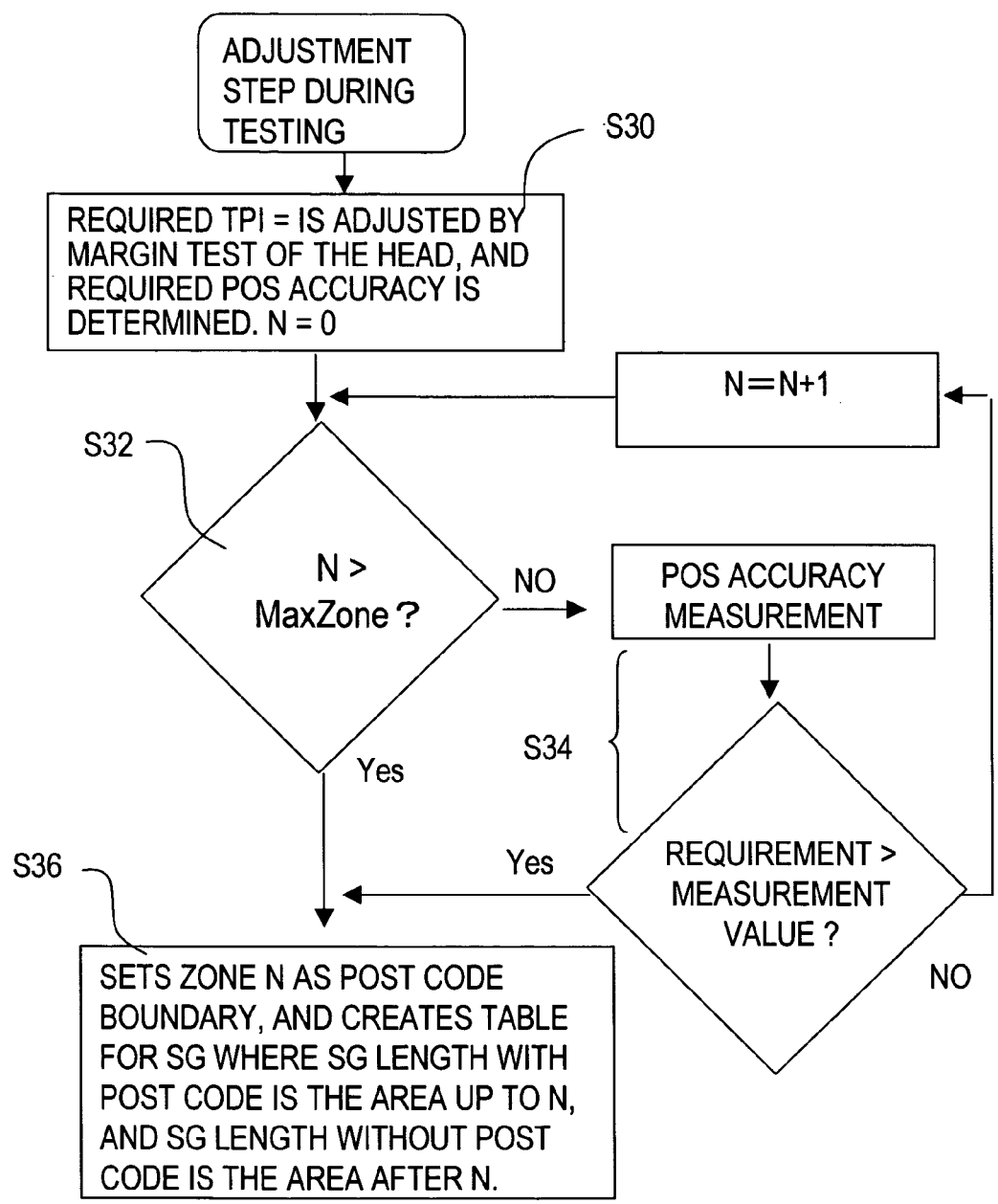
FIG. 10 is a flow chart depicting the post code boundary decision processing in FIG. 7.
Figure 11:
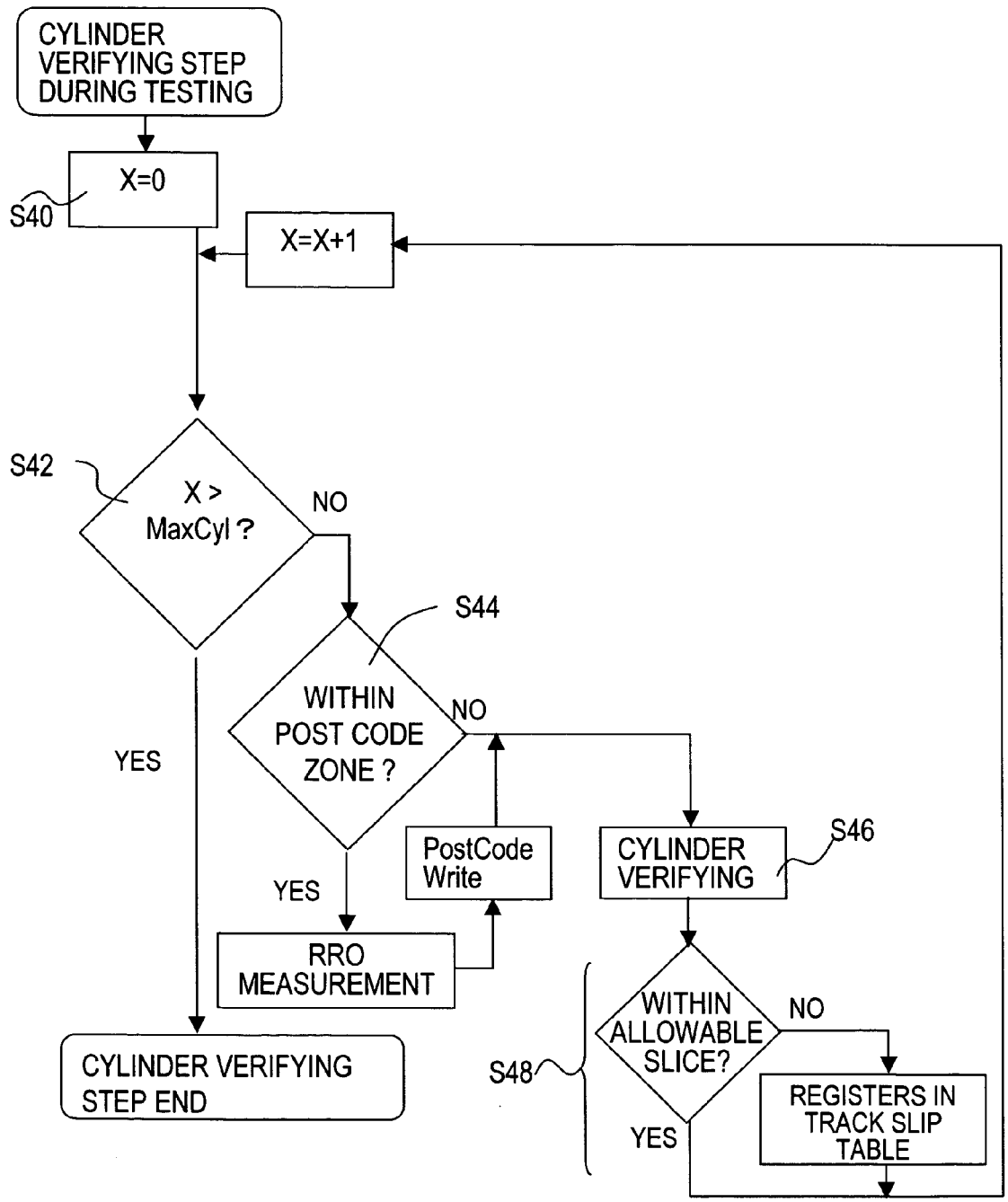
FIG. 11 is a flow chart depicting the post code measurement and write processing in FIG. 7.

FIG. 9 is a flow chart depicting the test step of the magnetic disk device in FIG. 1, FIG. 10 is a flow chart depicting the post code boundary decision processing in FIG. 9, and FIG. 11 is a flow chart depicting the post code write processing in FIG. 9.

The test step will now be described with reference to FIG. 9.

(S20) Using a dedicated device for writing servo patterns (servo track writer), servo patterns (servo frames other than post codes) are written to several tens of magnetic disk media simultaneously. For this dedicated device, a device which writes servo patterns by stamping may be used.

(S22) Then a required number of magnetic disk media on which this servo pattern is written are integrated into the magnetic disk device 1 in FIG. 1, and the actuator 3 and other components are installed, to assemble the magnetic disk device.

(S24) The test device corresponding to the host 10 in FIG. 1 is connected to the magnetic disk device 1, and the test program is downloaded from the test device to the magnetic disk device 1. The magnetic disk device 1 executes this test program for testing. In this test step, the post codes write processing in FIG. 10 and FIG. 11 is performed.

(S26) For the device 1 judged as a non-defective product by testing, the program for shipment is downloaded from the test device, is replaced with the test program, and is shipped.

Now the post code boundary decision processing will be described with reference to FIG. 10.

(S30) The margin test of the magnetic head 2 is performed, and the required TPI (Track Per Inch) of each zone and the required Pos accuracy are determined. For example, the ATI (Adjacent Track Influence) test of the magnetic head 2 is performed for each zone, TPI at which the ATI resistance does not become a desired slice or less is determined, and the Pos accuracy is determined from the slice of this ATI resistance. And the zone parameter (number) N is initialized to "0" (outermost). In FIG. 2, only the inner zone and outer zone are shown, but zones are further divided into 10 zones, for example.

(S32) It is judged whether N exceeded the maximum zone MaxZone.

(S34) If N does not exceed the maximum zone MaxZone, the Pos accuracy of this zone is measured. For example, the head is positioned on a representative track of this zone using the above mentioned burst signal, and the position error is measured. If the measured Pos accuracy is better than the above mentioned required Pos accuracy, the zone parameter N is incremented to N+1, and the processing returns to S32. If the measured Pos accuracy is not as good as the required Pos accuracy, the processing advances to step S36.

(S36) If N exceeded the maximum zone in step S32, or if the measured Pos accuracy is not as good as the required Pos accuracy in step S34, the zone N is determined as the post code boundary. And up to zone N is set as the SG length with post code (SGO in FIG. 7), and after zone N is set as the SG length without post code (SGI in FIG. 7) in the SG table 80.

Now the post code write processing will be described with reference to FIG. 11.

(S40) Cylinder number X is initialized to "0".

(S42) It is judged whether the cylinder number X exceeded the maximum cylinder MaxCyl. If exceeded, the processing ends.

(S44) If the cylinder number X does not exceed the maximum cylinder, it is judged whether the cylinder with this cylinder number X is within the above mentioned post code assigned zone. If the cylinder with this cylinder number X is in the post code assigned zone, the RRO of each sector of the cylinder (track) is measured, and the RRO correction value is written in the post code area 25. For example, the head is positioned by the burst signal and the position error is measured at each sector for a plurality of times, and the average value thereof is written as the RRO correction value.

(S46) Then cylinder is verified. In other words, the head is positioned by a burst signal, or a burst signal and post code, data is written and read, and it is confirmed that data was correctly written.

(S48) In this verifying, it is judged whether verifying succeeded with the allowable position shift of the head, and if verifying cannot be performed with the allowable position shift, this track number is registered in the track slip table in the memory 8-1. In other words, this track is not used for reading/writing data. And the cylinder number X is incremented to X+1, and the processing returns to step S42.

In this way, the post code boundary is judged by Pos accuracy, the post code zone and non-post code zone are separated and the servo gate lengths are set. And only for the tracks in the post code zone, the RRO measurement is performed, and the RRO correction value is written in the servo frame as the post code.

Second Embodiment

Figure 12:
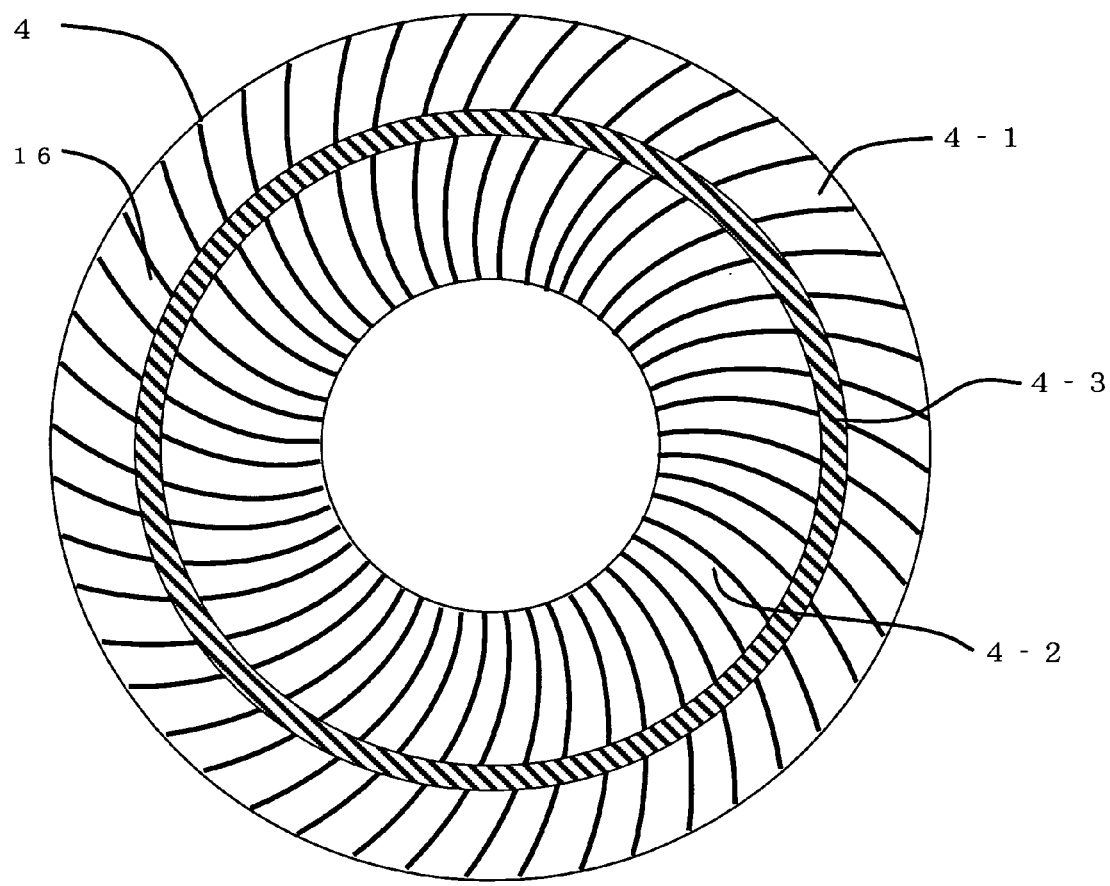
FIG. 12 is a diagram depicting the configuration of the disk according to the second embodiment of the present invention.
Figure 13:
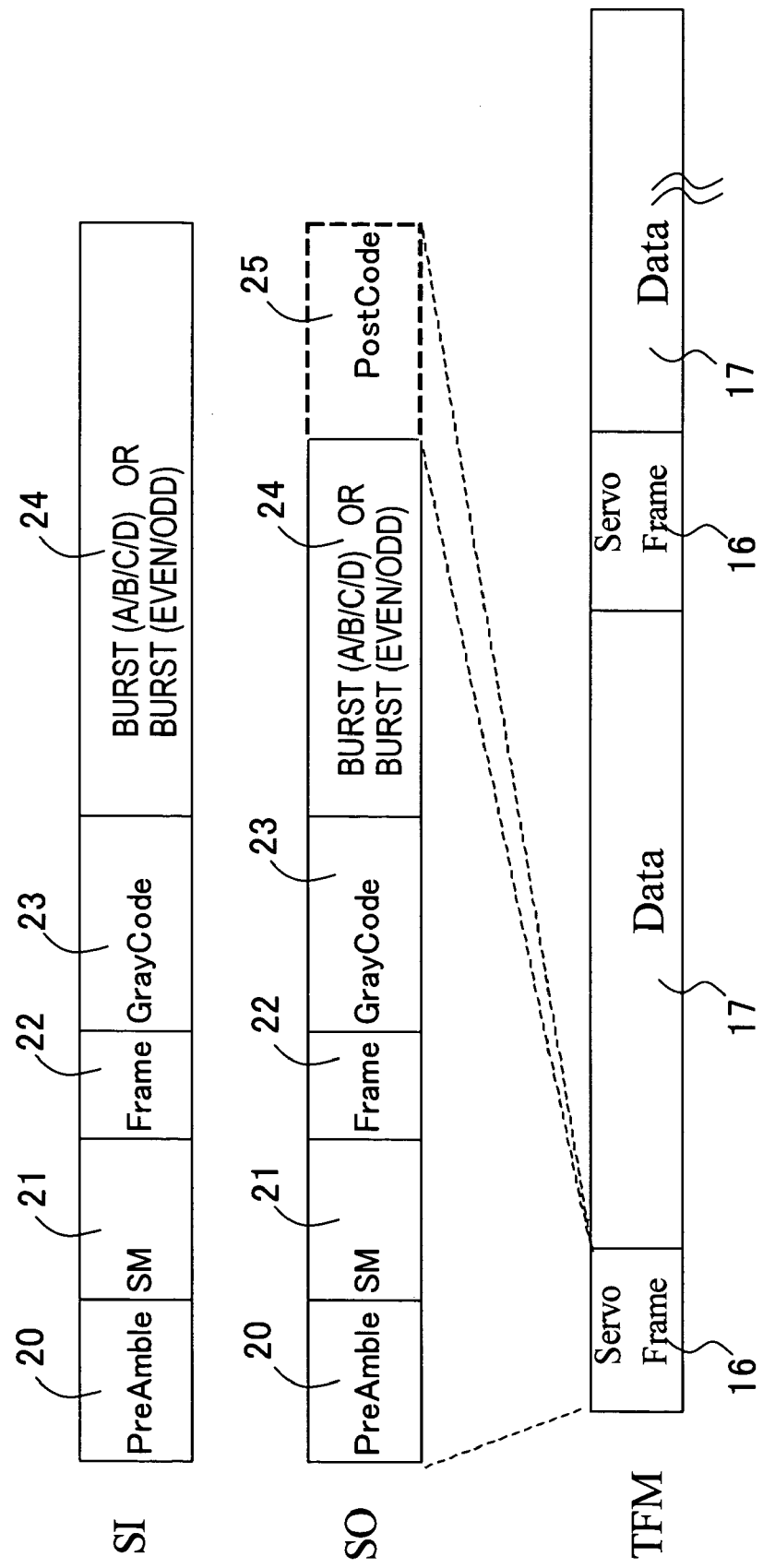
FIG. 13 is a diagram depicting the servo frame in FIG. 12.
Figure 14:
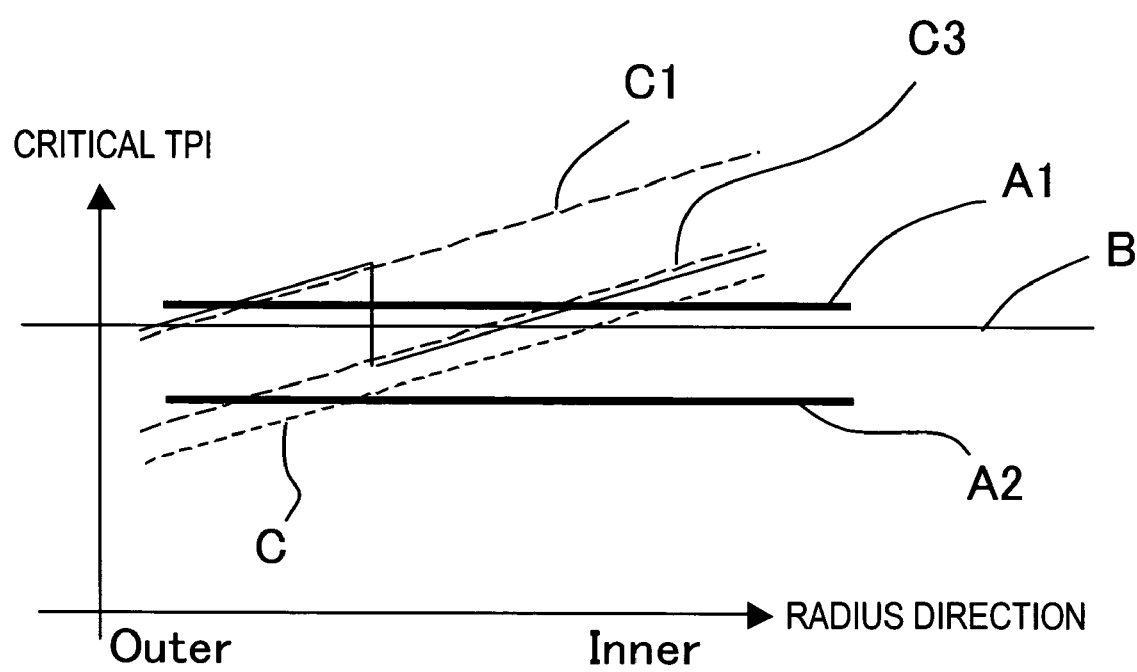
FIG. 14 is a characteristic diagram when the servo frame in FIG. 13 is used.

FIG. 12 is a diagram depicting the disk face according to the second embodiment of the present invention, FIG. 13 is a diagram depicting the configuration of the servo frame according to the second embodiment of the present invention, and FIG. 14 is a diagram depicting the second embodiment of the present invention.

As FIG. 13 shows, in the track format TFM, a combination of a servo frame 16 and data area 17 constitute a sector, and a plurality of sectors are set in one track of the disk. In the present embodiment, a servo frame for inner zone SI and a servo frame for outer zone SO are set as the servo frames 16. In the inner zone 4-2 in FIG. 12, the servo frame for inner zone SI is used and in the outer zone 4-1, the servo frame for outer zone SO is used.

The servo frames SI and SO have a preamble 20, servo mark 21, frame code 22, gray code 23 and burst signal 24. The post code 25 is set only for the servo frame for outer zone SO. The servo frame for inner zone SI is set to the same length as the servo frame for outer zone SO by increasing the length of the burst signal 24.

When the length of the burst signal 24 of the servo frame for inner side SI is increased, that is if the area is increased, the burst signals 24 which are read are averaged, and the accuracy of the demodulation position improves. For example, if the track width is 100 nm, a defect of magnetic particles of the magnetic disk, which are about 8 nm, may influence the demodulation accuracy. This influence is conspicuous particularly when the position is demodulated by the area proportion to the burst signal.

Therefore the Pos accuracy is also improved for the inner side where the post code is not assigned. Because of this, the critical TPI characteristic of the disk 4 becomes like the solid line C3 in FIG. 14, and sufficiently satisfies the line B, which is the average required TPI. Since the post code 25 is not set in the inner zone 4-2, RRO can be measured, and the eccentricity amount can be written in the post code 25 only for the outer zone 4-1 in the inspection step at the manufacturer. Therefore the inspection time of the post codes can be considerably decreased.

In this way, the TPO characteristic indicated by the critical TPI is improved, as described above, so the inspection time can be decreased, and the position accuracy can be improved with improving productivity. In other words, disk devices with excellent position accuracy can be provided at low cost.

Also as FIG. 13 shows, the inner side zone where the post code 25 is not set has the same servo frame length as the outer zone, so the operation to make the servo gate variable can be omitted.

As FIG. 12 shows, a boundary zone 4-3 is created between the inner zone 4-2 and the outer zone 4-1, as a slip zone. In other words, since the burst length of the inner zone and outer zone differs, if the head is positioned on the boundary between the inner zone 4-2 and the outer zone 4-1, the demodulation accuracy of the burst signal becomes different between adjacent tracks, and the head cannot be positioned stably. Therefore the boundary zone 4-3 is created as a slip zone, so as to prevent unstable positioning.

Figure 15:
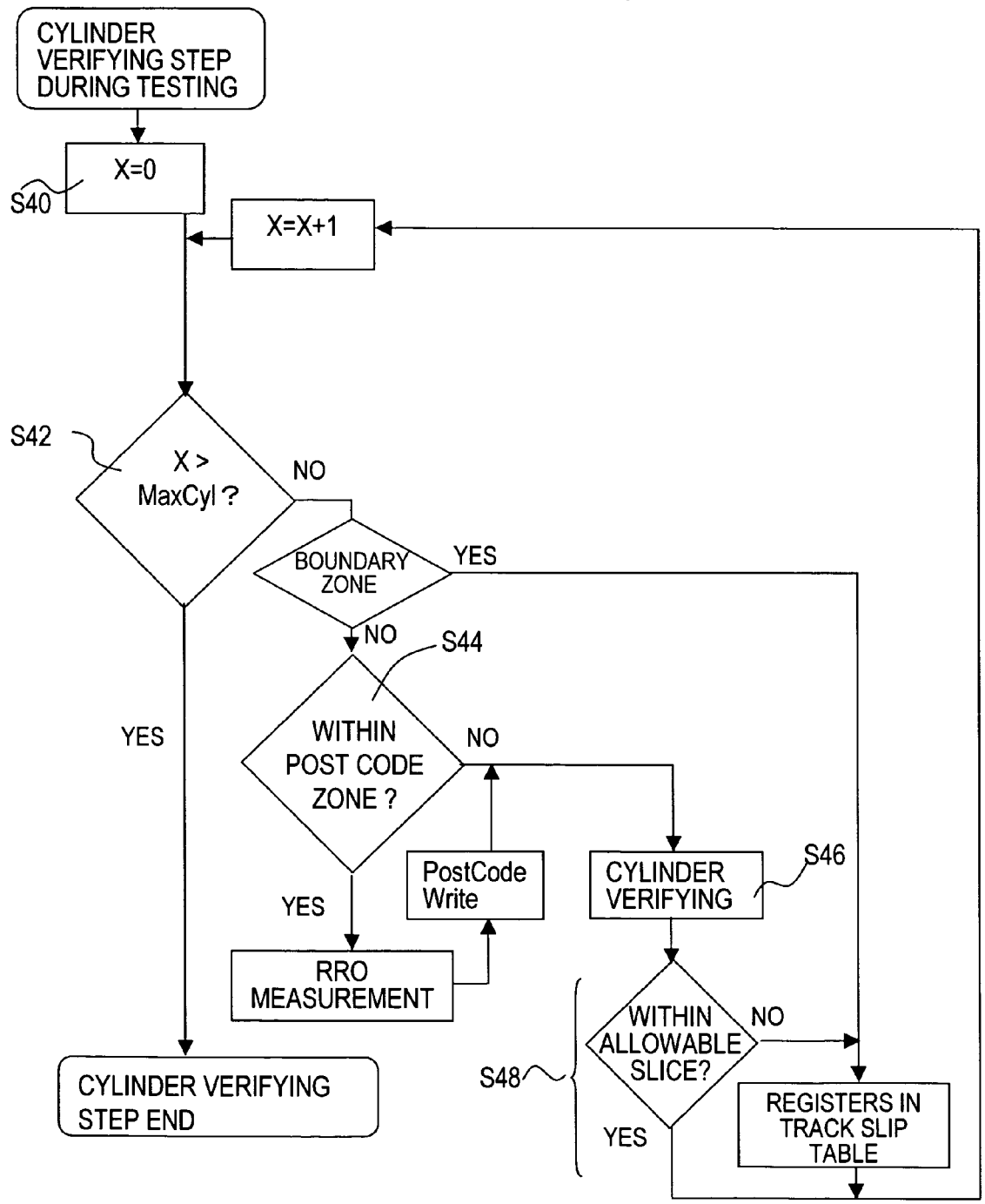
FIG. 15 is a flow chart depicting the post code measurement and write processing in FIG. 12.
Figure 16:
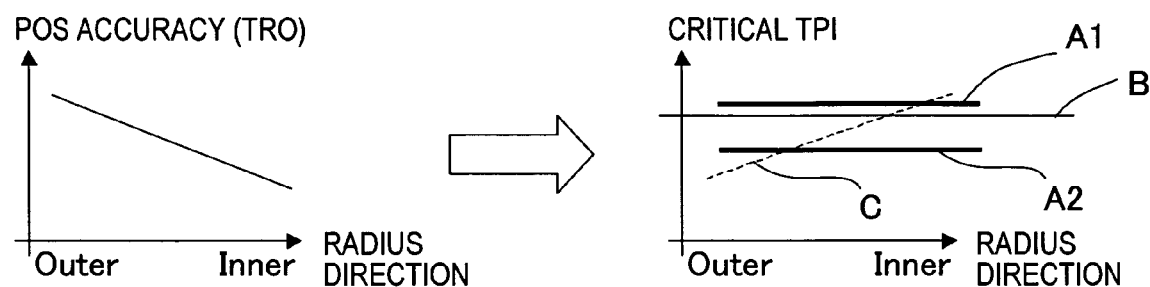
FIG. 16 is relational diagram of the position accuracy and disk position.

The post code writes processing according to the second embodiment will now be described with reference to FIG. 15. In FIG. 15, steps the same as those in FIG. 11 are denoted with the same reference symbols, and description thereof is omitted.

In FIG. 15, if it is judged that the cylinder number X does not exceed the maximum cylinder MaxCyl in step S42, it is judged whether the cylinder with this cylinder number X is in the above mentioned post code boundary zone 4-3. If the cylinder with the cylinder number X is in the post code boundary zone 4-3, this cylinder number X is registered in the Track Slip Table, and if the cylinder with the cylinder number X is not in the post code boundary zone 4-3, the processing advances to S44 (S50).

In this way, the post code boundary is judged by the Pos accuracy, the post code zone and non-post code zone are separated, RRO measurement is performed only for the track in the post code zone, and the RRO correction value is written in the servo frame as the post code.

Other Embodiments

In the above embodiments, the disk device was described using an example of the magnetic disk device, but the present invention can be applied to other disk devices, such as an optical disk device. Also it was described that the post code boundary decision processing is performed in all the devices, but the post code boundary may be decided in a representative device of a lot, and the result may be used for the other devices. Also TPI is different in each zone in the above embodiments, but the present invention can also be applied to the case when TPI is the same for each zone.

The present invention was described using the embodiments, but the present invention can be modified in various ways within the scope of the essential character thereof, and these variant forms shall not be excluded from the scope of the present invention.

A servo frame of a disk where a servo frame not having a post code is recorded in an inner side zone and a servo frame having a post code is recorded in an outer side zone is read, a current position is demodulated from the servo frame, an actuator is driven according to the demodulated position, and the position of the head is controlled to a target position. So while implementing a high TPI, the inspection time for post codes can be decreased with a servo frame occupying ratio considering the data format.

What is claimed is:

1. A disk device, comprising:
a disk divided into at least an inner side zone and an outer side zone, where a servo frame not having a post code is recorded in said inner side zone and a servo frame having a post code is recorded in said outer side zone;
a head for at least reading the servo frame and data on said disk;
an actuator for moving said head in the radius direction of said disk; and
a control unit for demodulating a current position from said servo frame read by said head, driving said actuator according to the demodulated position, and controlling the position of said head to a target position.

2. The disk device according to claim 1, wherein said control unit corrects the demodulated position obtained from a burst signal of said servo frame using a correction value of said post code to demodulate the current position of said head.

3. The disk device according to claim 1, wherein said control unit changes the length of a servo gate signal for extracting said servo frame from read output of said head according to said target position.

4. The disk device according to claim 3, wherein said control unit judges that said target position is in said outer side zone, and makes the length of the servo gate signal for extracting said servo frame longer than the length of the servo gate on said inner side.

5. The disk device according to claim 3, wherein said control unit has a table for storing the respective servo gate length of said outer side zone and said inner side zone.

6. The disk device according to claim 1, wherein the length of the servo frame not having said post code of said disk and the length of the servo frame having said post code are the same.

7. The disk device according to claim 6, wherein the burst signal length of the servo frame not having the post code is increased to be the same as the length of the servo frame having said post code.

8. The disk device according to claim 7, wherein a track slip area is provided between said inner side zone and said outer size zone of said disk.

9. The disk device according to claim 1, wherein said control unit measures the position accuracy of each zone of said disk, and determines the boundary between said inner side zone and said outer side zone.

10. The disk device according to claim 1, wherein said disk comprises a magnetic disk, and said head comprises a magnetic head.

11. A head position control method, comprising the steps of:
reading a servo frame and data on a disk divided into at least an inner side zone and an outer side zone, where a servo frame not having a post code is recorded in said inner side zone and a servo frame having a post code is recorded in said outer side zone, by a head;
demodulating a current position from said servo frame read by said head; and
driving an actuator for moving said head in the radius direction of said disk and controlling the position of said head to a target position.

12. The head position control method according to claim 11, wherein said demodulation step further comprises a step of correcting the demodulated position obtained from a burst signal of said servo frame using a correction value of said post code to demodulate the current position of said head.

13. The head position control method according to claim 11, further comprising a step of changing the length of a servo gate signal for extracting said servo frame from read output of said head according to said target position.

14. The head position control method according to claim 13, wherein said change step further comprises:

a step of judging that said target position is in said outer side zone; and
a step of making the servo gate signal length for extracting said servo frame longer than the servo gate length on said inner side when judging that said target position is in said outer side zone.

15. The head position control method according to claim 11, wherein said reading step further comprises a step of reading said servo frame from a disk where the length of the servo frame not having said post code of said disk and the length of the servo frame having said post code are the same.

16. A head position control device, comprising:
a demodulation circuit for demodulating a current position from a servo frame read from a disk divided into at least an inner side zone and an outer side zone, where a servo frame not having a post code is recorded in said inner side zone and a servo frame having a post code is recorded in said outer side zone, by a head; and
a control circuit for driving an actuator for moving said head in the radius direction of said disk according to said modulated position, and controlling the position of said head to the target position.

17. The head position control device according to claim 16, wherein said demodulation circuit corrects the demodulated position obtained from a burst signal of said servo frame using a correction value of said post code to demodulate the current position of said head.

18. The head position control device according to claim 16, wherein said demodulation circuit changes the servo gate signal length for extracting said servo frame from read output of said head according to said target position.

19. The head position control device according to claim 18, wherein said demodulation circuit judges that said target position is in said outer side zone, and makes the servo gate signal length for extracting said servo frame longer than the servo gate length on said inner side.

20. The head position control device according to claim 16, wherein said demodulation circuit extracts said servo frame from a disk where the length of the servo frame not having said post code of said disk and the length of the servo frame having said post code are the same.

* * * * *